Figure 1:
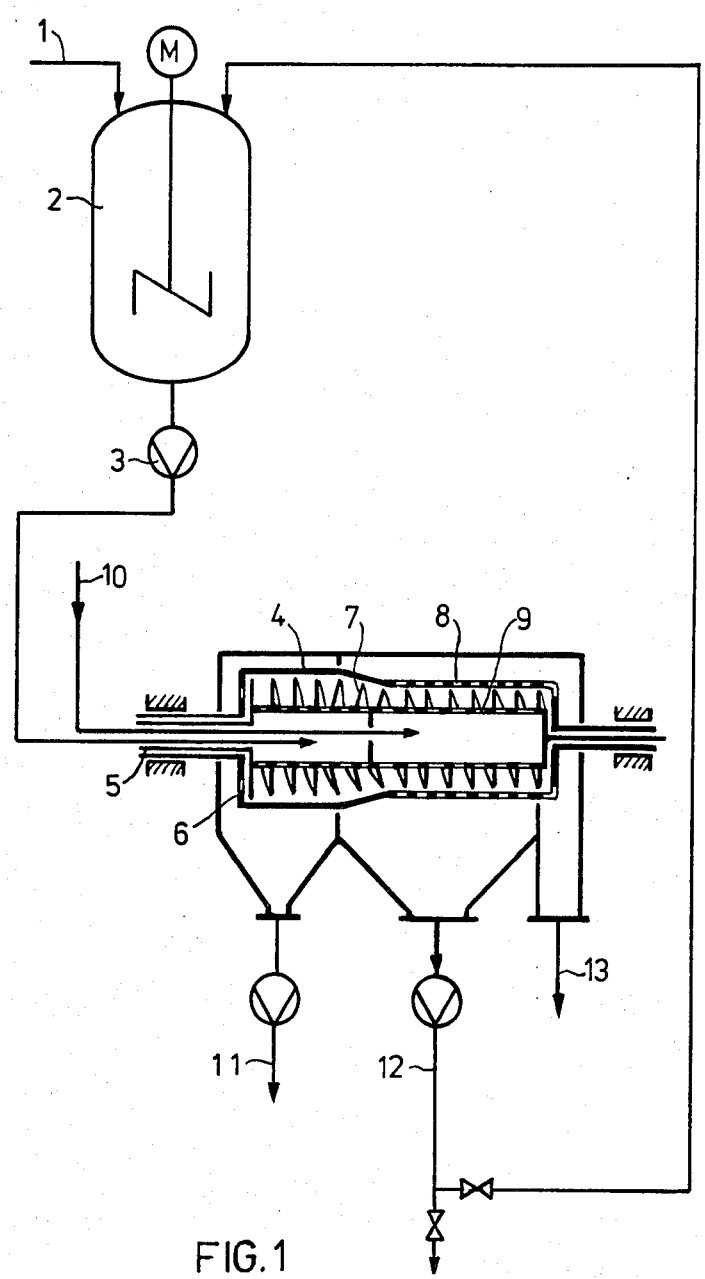

United States Patent [19]

Bernert et al.

[11] 4,398,024
[45] Aug. 9, 1983

[54] PROCESS FOR THE PURIFICATION OF CELLULOSE AND STARCH ETHERS

[75] Inventors: Claus-Rüdiger Bernert; Christian Kords, both of Walsrode; Detmar Redeker, Cologne, all of Fed. Rep. of Germany

[73] Assignees: Wolff Walsrode Aktiengesellschaft, Walsrode; Bayer Aktiengesellschaft, Leverkusen, both of Fed. Rep. of Germany

[21] Appl. No.: 321,067

[22] Filed: Nov. 13, 1981

[30] Foreign Application Priority Data

Nov. 19, 1980 [DE] Fed. Rep. of Germany ....... 3043621

[51] Int. Cl.³ .......................... B04B 1/20; C08B 11/20
[52] U.S. Cl. ........................................ 536/85; 536/98; 536/111
[58] Field of Search ............................ 536/85, 111, 98

[56] References Cited

U.S. PATENT DOCUMENTS

| | | | |
|---|---|---|---|
| 2,749,336 | 6/1956 | Boddicker et al. | 536/98 |
| 3,085,087 | 4/1963 | Henry et al. | 536/98 |
| 3,347,855 | 10/1967 | Nelson | 536/98 |
| 3,498,971 | 3/1970 | Blasa et al. | 536/101 |
| 3,574,188 | 4/1971 | Takehara et al. | 536/88 |
| 3,873,518 | 3/1975 | Strange et al. | 536/91 |
| 3,900,463 | 8/1975 | Yada et al. | 536/98 |
| 4,048,433 | 9/1977 | Burns et al. | 536/88 |
| 4,229,572 | 10/1980 | Zweigle | 536/85 |
| 4,296,235 | 10/1981 | Ziche | 536/85 |

FOREIGN PATENT DOCUMENTS

| | | |
|---|---|---|
| 53741 | 6/1982 | European Pat. Off. . |
| 1801553 | 5/1970 | Fed. Rep. of Germany . |
| 1532683 | 2/1971 | Fed. Rep. of Germany . |
| 2017454 | 10/1971 | Fed. Rep. of Germany . |
| 2038310 | 2/1972 | Fed. Rep. of Germany . |
| 2304603 | 8/1974 | Fed. Rep. of Germany . |
| 1249618 | 10/1971 | United Kingdom . |

*Primary Examiner*—A. Lionel Clingman
*Attorney, Agent, or Firm*—Connolly and Hutz

[57] ABSTRACT

A process for purification and working-up of cellulose or starch ethers using a solid-jacket sieve centrifuge for removing the suspension agent extraction with purifying agent and isolation of the purified ether product.

4 Claims, 1 Drawing Figure

PROCESS FOR THE PURIFICATION OF CELLULOSE AND STARCH ETHERS

This invention relates to a continuous process for the purification and working-up of cellulose and starch ethers using a solid-jacket sieve worm centrifuge.

Cellulose and starch ethers, for example sodium carboxymethyl cellulose, hydroxyethyl cellulose, methyl cellulose, methyl hydroxypropyl cellulose, carboxymethyl starch and ethyl hydroxyethyl cellulose, are produced by treating the cellulose or starch with sodium hydroxide and then by etherificating it at elevated temperature with one or more compounds like monochloracetic acid, ethylene oxide, methyl chloride, propylene oxide or ethyl chloride.

This etherification reaction is accompanied by the formation of side products like salts, for example sodium chloride, sodium glycolate and sodium acetate, which must be removed from the cellulose or starch ether before it can be used.

Purification is normally carried out by using hot water when the ether flocculates in it, as in case of methyl cellulose and many of its mixed ethers. When this flocculation does not occur in water at an elevated temperature, as is in case of carboxymethyl cellulose, carboxymethyl starch, hydroxyethyl cellulose and methyl cellulose produced using large quantities of epoxide, a water-miscible component, for example an lower alcohol like methanol, ethanol or isopropanol, has to be added to the water. The concentration of the alcohols is adjusted such that maximum solubility of the salts is guaranteed whilst the reaction product itself is not dissolved, i.e. between about 45 and 75% by weight of the mixture depending upon the type of alcohol used and working temperature applied.

According to conventional purification processes (German Offenlegungsschrifts Nos. 1,801,553 and 2,457,187) the moist crude product usually in form of a paste within a suitable alcohol/water mixture or in hot water is separated off after different residence times using centrifuges, decanters, drum filters, plate filters or band filters. Alternatively, it is possible (for example as described in German Pat. No. 2,017,454) to purify the dried, salt-containing ether in granulate form using a counter-current extractor. Whereas this particular process is attended by the disadvantage that the necessary intermediate drying step is expensive in terms of energy consumption, purification of the moist product in batches (for example according to U.S. Pat. No. 3,498,971) is attended by the disadvantage of long extraction times, according to the pretreatment, whilst continuous extraction requires large quantities of purifying agents.

The process according to this invention eliminates the need for intermediate drying and the preparation of pastes and leads directly to a highly purified cellulose or starch ether by a combination of the separation (of solids) and extraction process steps carried out continuously.

The present invention provides a continuous process for the purification and isolation of a reaction product comprising a cellulose or starch ether suspension by removing the suspending agent, extracting the reaction product using a purifying agent and removing by centrifuging the purifying agent, wherein removal of the suspending agent, extraction with the purifying agent and recovery of the cellulose or starch ether are carried out by means of a solid-jacket sieve worm centrifuge.

It is known that solid-jacket decanters can be used for separating the cellulose or starch ethers from their suspension agent after the etherification or extraction step. For example, crude methyl cellulose, after suspension in hot water, may be separated off from its mother liquor in such a decanter. However, a single purification requires at least 20 times the quantity of purifying agent, based on dried, purified product. Whereas this does not involve any significant increase in costs or environmental pollution in cases where water is used, the use of alcohol/water mixtures, for example, necessitates distillation. Because of this, it is desirable to use as small a quantity of purifying agent as possible. This is made possible by the use, according to the invention, of solid-jacket sieve worm centrifuges.

A solid-jacket sieve centrifugre (FIG. 1) is a unit of which the rear part consists of a solid-jacket decanter (4) into which the product suspension (1) is introduced in conventional manner from a storage tank (2) through a pump (3) and a central pipe (5).

The suspension agent (11) separated off flows off rearwards via a baffle (6) whilst a central screw (7) conveys the moist material frontwards. The front part of the rotating jacket consists of a filter zone (8) which is smaller in diameter than the rear part of the jacket (4) so that the mother liquor is prevented from passing into the filter zone. A purification agent (10) may be uniformly introduced through a number of nozzles (9) along the screw threads in the region of the filter zone. The leading zone is free from nozzles to ensure that the product is re-moistened. The used purification agent (12) is either discharged or recirculated. The purified product (13) is worked up in conventional manner.

One particular advantage of one extraction step lies in the fact that the purifying agent which is used for washing out of the filter and which is able to absorb small quantities of salt in the short extraction time, in the sieve zone being permeated by cellulose ether or starch ether particles throughout the filter zone, is able to be refurned as purifying agent into the extraction stage virtually in countercurrent. This is largely the basis for the favourable ratio of product to purification agent of between 1:5 and 1:10.

The process according to the invention may be used for working up cellulose or starch ether suspensions of types which flocculate readily in hot water, for example methyl cellulose, methylhydroxyethyl cellulose, methylhydroxy propyl cellulose and ethylhydroxyethyl cellulose; of types which do not flocculate readily in hot water, for example methyl carboxymethyl cellulose and methyl celluloses containing large numbers of hydroxyethyl or hydroxypropyl groups; and of types which do not flocculate in hot water, for example hydroxyethyl cellulose, sodium carboxymethyl cellulose, sodium carboxymethyl starch and hydroxypropyl starch. The process according to the invention, is preferably applied to the last of the above-mentioned types.

The suspending and purifying agents used are the agents normally used for the particular cellulose or starch ether.

In one particularly preferred embodiment, the process according to the invention is used for working up cellulose or starch ether suspensions immediately after the etherification step, for example for working up hydroxyethyl cellulose, sodium carboxymethyl cellulose or sodium carboxymethyl starch in alcohol/water mixtures, for example in isopropanol/water mixtures, in which case the purifying agent or extractant is different from the suspending agent.

Hitherto, it was necessary because of the inadequate dissolving ability of the suspending agent for the salts, namely sodium chloride, sodium glycolate and sodium acetate, initially to subject the suspension of the ether to a separation step for the removal of solids, to recover the residual solvent, to disperse the crude product in an alcohol/water mixture of adequate salt-dissolving ability, for example aqueous methanol, and to separate off the purified product after a sufficient extraction time. In the process according to the invention, the suspension obtained after the etherification step is freed from the suspending agent in the solid-jacket decanter part of the solid-jacket sieve worm centrifuge. The suspending agent flows off rearwards and may be reused without distillation for the etherification reaction. In the filter section, the crude product is then sprayed with the purifying agent which emerges through the sieve and passes optionally onto the working-up stage or is used again for purification. A highly purified product is obtained after a surprisingly short extraction time.

EXAMPLE 1

Methyl hydroxypropyl cellulose (HPMC) in an aqueous suspension having a temperature of 96° C. and a solids content of 8% (based on HPMC) is delivered directly after the etherification at a rate of 750 17/h to a solid-jacket sieve centrifuge (drum diameter 150 mm, acceleration value 790 G) and washed on the sieve with 300 l/h of hot water (96° C.). The resulting HPMC has a NaCl content of 0.27%.

EXAMPLE 2

A neutralised suspension of 10% of hydroxypropyl cellulose in a mixture of 72% of ethanol and 28% of water is delivered directly of the etherification step at a rate of 700 l/h to the solid-jacket sieve centrifuge described in Example 1 and washed on the filter with 350 l/h of the above described alcohol mixture. The resulting hydroxylpropyl cellulose has a sodium acetate content of 0.2%.

EXAMPLE 3

A neutralised suspension of 10% of hydroxyethyl cellulose in a mixture of 63% of isopropanol and 27% of water is delivered at a rate of 750 l/h to the solid-jacket sieve centrifuge described in Example 1 and washed on the filter with 400 l/h of the above alcohol mixture. The resulting purified product has a sodium acetate content of 0.15%.

EXAMPLE 4

A neutralised suspension of 10% of sodium carboxymethyl cellulose (CMC) in a mixture of 65% of methanol and 35% of water is delivered directly after the etherification step at a rate of 750 l/h to the solid-jacket sieve centrifuge described in Example 1 and washed on the filter with 400 l/h of the above alcohol mixture. The pure CMC obtained contains 0.23% of sodium chloride, 0.11% of sodium glycolate and only traces of sodium acetate.

EXAMPLE 5

The procedure is as described in Example 4 using a suspension of 10% of sodium carboxymethyl starch in a mixture of 75% of ethanol and 25% of water. The product obtained after washing contains 0.12% of sodium chloride 0.09% of sodium glycolate and only traces of sodium acetate.

EXAMPLE 6

A suspension (emanating from etherification) of 10% of carboxymethyl cellulose (CMC) in a mixture of 86% of isopropanol and 14% of water is delivered at a rate of 700 l/h to the solid-jacket filter centrifuge described in Example 1, the suspending agent is separated off on the solid-jacket decanter of the centrifuge and returned to the etherification stage. A mixture of 70% of methanol and 30% of water flows to the filter section of the centrifuge at a rate of 490 l/h. The pure CMC separated off and dried contains 0.38% of sodium chloride.

EXAMPLE 7

The procedure is as described in Example 6 using 490 l/h of a washing medium of 25% of isopropanol, 45% of methanol and 30% of water. The product contains 0.33% of sodium chloride.

EXAMPLE 8

The procedure is as described in Example 6 using a suspension (emanating from etherification) of 10% of carboxymethyl starch in a mixture of 89% of isopropanol and 11% of water. After washing, the product still contains 0.18% of sodium chloride.

We claim:

1. The process for the purification and isolation of a crude reaction product comprising a cellulose or starch ether suspension by removing the suspending agent, said process comprising introducing the cellulose or starch ether suspension into a solid jacket sieve worm centrifuge, separating off the suspending agent leaving a moist solid which is then conveyed to the filter zone of said centrifuge, uniformly contacting the moist solid with a purifying agent, separating the purifying agent from the solid by centrifuge and recovering purified cellulose or starch ether solid.

2. The process according to claim 1 wherein the process is continuous.

3. The process according to claim 1 wherein the suspending agent is chemically different from the purifying agent.

4. The process according to claim 1 wherein the purifying agent is a water/alcohol mixture.

* * * * *